US011628529B2

(12) United States Patent
Li

(10) Patent No.: US 11,628,529 B2
(45) Date of Patent: Apr. 18, 2023

(54) ENGRAVING FIXTURE FOR MULTIPLE SERIALLY ARRANGED OBJECTS

(71) Applicant: Tong Li, Haslett, MI (US)

(72) Inventor: Tong Li, Haslett, MI (US)

(*) Notice: Subject to any disclaimer, the term of this patent is extended or adjusted under 35 U.S.C. 154(b) by 269 days.

(21) Appl. No.: 17/089,422

(22) Filed: Nov. 4, 2020

(65) Prior Publication Data

US 2022/0134495 A1 May 5, 2022

(51) Int. Cl.
*B23Q 1/54* (2006.01)

(52) U.S. Cl.
CPC ........................ *B23Q 1/54* (2013.01)

(58) Field of Classification Search
CPC ..... A47B 73/00; A47G 23/02; B01F 11/0025; B23K 37/0426; B23K 37/0538; B23Q 1/40; B23Q 3/00; B23Q 3/02; B23Q 3/105; B23Q 7/05; B23Q 7/055; B41F 17/28; B41P 2217/61; B41P 2217/62; B65C 9/045; F16M 11/2028
See application file for complete search history.

(56) References Cited

U.S. PATENT DOCUMENTS

| | | | | |
|---|---|---|---|---|
| 3,266,213 A * | 8/1966 | Harris | ..................... | B65B 21/26 53/49 |
| 8,309,881 B2 | 11/2012 | Li | | |
| 10,654,127 B2 | 5/2020 | Li | | |
| 2004/0095845 A1* | 5/2004 | Peterman, Jr. | .......... | B01F 29/31 366/213 |
| 2016/0121437 A1* | 5/2016 | Berglund | .......... | B23K 37/0538 269/55 |

FOREIGN PATENT DOCUMENTS

| | | |
|---|---|---|
| DE | 3917774 A1 | 12/1990 |
| EP | 0759852 A1 | 3/1997 |
| EP | 3476523 A2 | 5/2019 |
| GB | 839625 A | 6/1960 |

\* cited by examiner

*Primary Examiner* — Tyrone V Hall, Jr.
(74) *Attorney, Agent, or Firm* — Young Basile Hanlon & MacFarlane, P.C.

(57) ABSTRACT

A fixture for facilitating the serial engraving of a plurality of cylindrical objects such as glasses or mugs mounted on individual serially arranged stations along a master base plate. Each station includes a drive structure and, spaced therefrom, a passive support structure. The two structures in each station can be gang-adjusted for object length. In addition, the support structures can be height-adjusted to level the engraved surfaces of tapered objects. All of the drive structures include drive wheel pairs and all are driven by a single stepper motor via a single shaft and individual belt and pulley systems.

9 Claims, 10 Drawing Sheets

ENGRAVING FIXTURE FOR MULTIPLE SERIALLY ARRANGED OBJECTS

FIELD OF THE INVENTION

This application describes an engraving fixture mounted within the housing of an engraving machine including an engraving tool such as a laser movable along a horizontal X axis to perform an engraving process on a plurality of serially arranged objects such as ceramic or glass mugs.

BACKGROUND OF THE INVENTION

It is known to use tools such as lasers and rotary cutters to engrave letters, numbers and/or images on the outer surface of various objects made of any of a variety of materials including wood, plastic, glass, ceramic, stone and/or metal. Where multiple objects are to be similarly engraved, a savings of time and an increase in efficiency can be achieved by mounting the objects in such a way to permit the engraving tool to encounter and engrave the objects serially. If the objects are cylindrical, it is necessary to incrementally rotate the objects between passes of the engraving tool so that the tool can perform the overall process of creating a two-dimensional result.

SUMMARY OF THE INVENTION

The fixture hereinafter described is intended for use within a housing which also includes a tool such as a laser or rotary cutter that is movable along at least one axis, herein described as the "X axis". The objects to be engraved are all placed at a fixed distance from the effective tool location. Where the objects are cylindrical and the engraving result is essentially two-dimensional in character, means are provided to rotate the objects incrementally about a common axis parallel to the axis of tool movement thereby to allow synchronized multiple passes of the tool to complete a two-dimensional engraving job on each of the objects.

In the following description of an illustrative embodiment, the tool is a laser and the fixture comprises a base member in the form of an extruded metal plate along which a series of object-receiving stations are located. Each station includes a set of drive wheels on a plate that is mounted on the base member. A second structure, hereinafter called a "slave beam", is equipped with multiple plates carrying sets of idler wheels spaced horizontally from the drive structure. The two structures in each station form a holder on which a generally cylindrical object can be placed and held in a stable fashion. The stations, as indicated above, are arranged in a series along the X axis. The drive wheels in all stations are gang-driven to incrementally rotate the objects between passes of the engraving tool. In the preferred form, the fixture is provided with means for gang-adjusting both the distance between the drive and the slave structures and the height of the slave structures. Height adjusting the slave wheels is performed to level the surfaces to be engraved by the laser or other tool thereby eliminating the need to adjust the height of the tool as it moves along the length of the engraving field. Distance adjustments between the drive and idler wheels allow for objects of different lengths. In the preferred form, the gang-adjustments are performed by means of mechanical systems which are hand adjusted but, as will be apparent to persons skilled in the art, the adjustments may also be performed by powered means under human or machine control.

The drive system in the illustrative embodiments hereinafter described in greater detail comprise a stepper motor for incrementally rotating a drive shaft that extends along the base member and is connected to the drive wheels in each of the stations by means of a system of pulleys and drive belts connected around the pulleys to rotate the drive wheels and the objects being engraved simultaneously and incrementally in the same direction during the engraving process. As will be understood by those skilled in the art, both the timing of the laser beam excitation and the incremental rotation of the drive wheels by way of the motor shaft is controlled through a digital system using a digitized code for turning the laser on and off to create the pattern which is to be engraved. The digitization also incrementally adjusts the position of the object surfaces rotation relative to the laser travel axis during the engraving process scan sequence wherein the laser and the laser beam is moved back and forth along the horizontal X axis until the entire engraving process is completed.

Means are provided to hold the objects in position in the stations by preventing lifting and/or axial shifting.

BRIEF DESCRIPTION OF THE DRAWINGS

FIG. 8A shows a detail of a drive wheel; and

DETAILED DESCRIPTION OF THE ILLUSTRATIVE EMBODIMENTS

Referring to the FIGS. 1-6 a master beam 10 of extruded aluminum having a rectangular cross section is adapted to lay flat on, for example, a support screen defining the bottom surface of an engraver housing (not shown) of the type including a laser with a downwardly directed focus-adjustable laser beam adapted for incremental program-controlled movement along a horizontal axis, here the X-axis, parallel to the master beam 10 mounted within the housing. Such an arrangement is described in my U.S. Pat. No. 10,654,127, the entire disclosure of which is incorporated by reference. Y-axis movement is typically also provided in such a machine but in these embodiments is replaced by means for rotating the objects M between laser passes.

Figure 1:
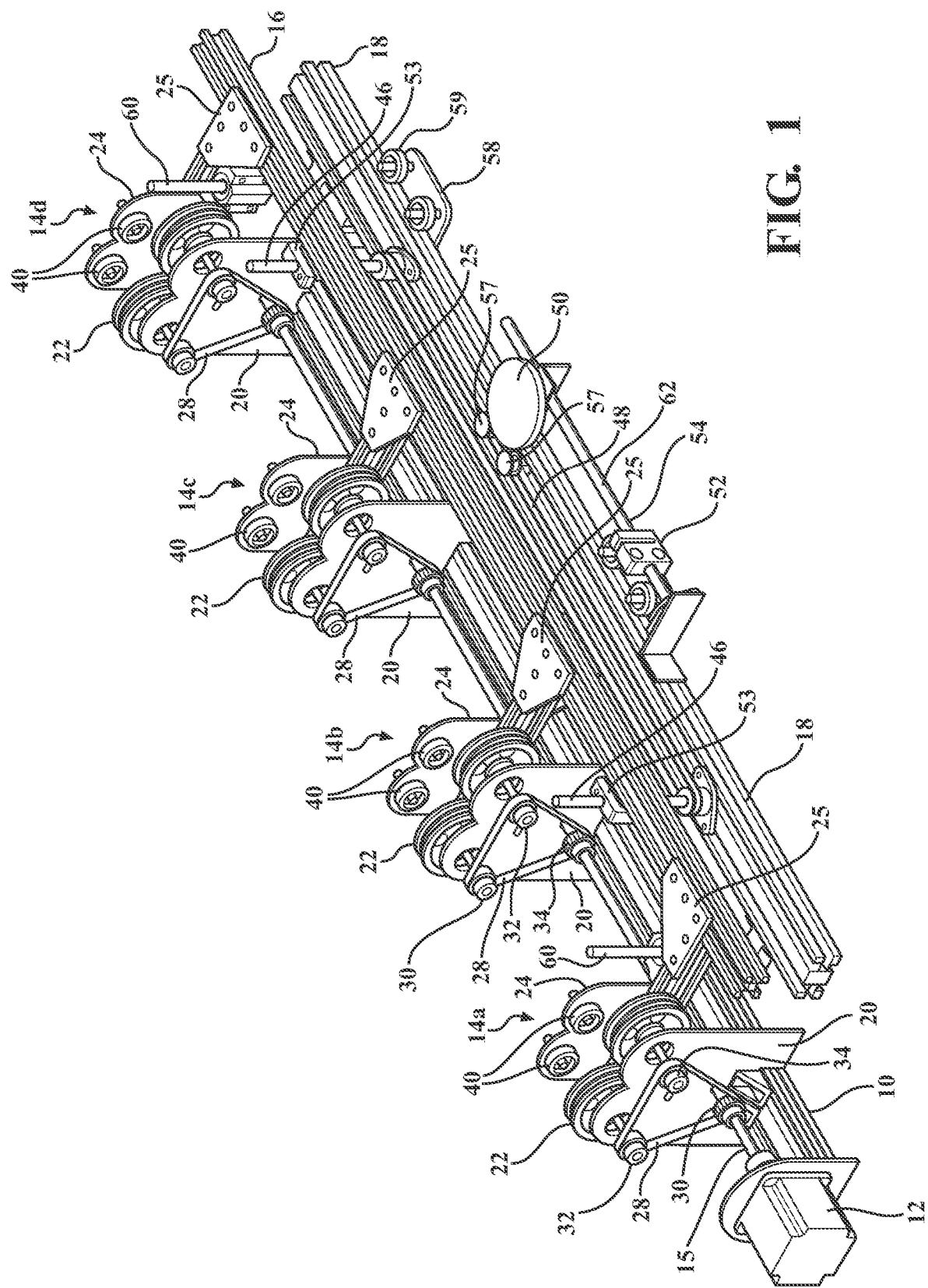
FIG. 1 is a perspective view of an engraving fixture showing a base beam, a slave beam, a lifting frame and the size and height adjusting systems as well as details of the drive system.
Figure 2:
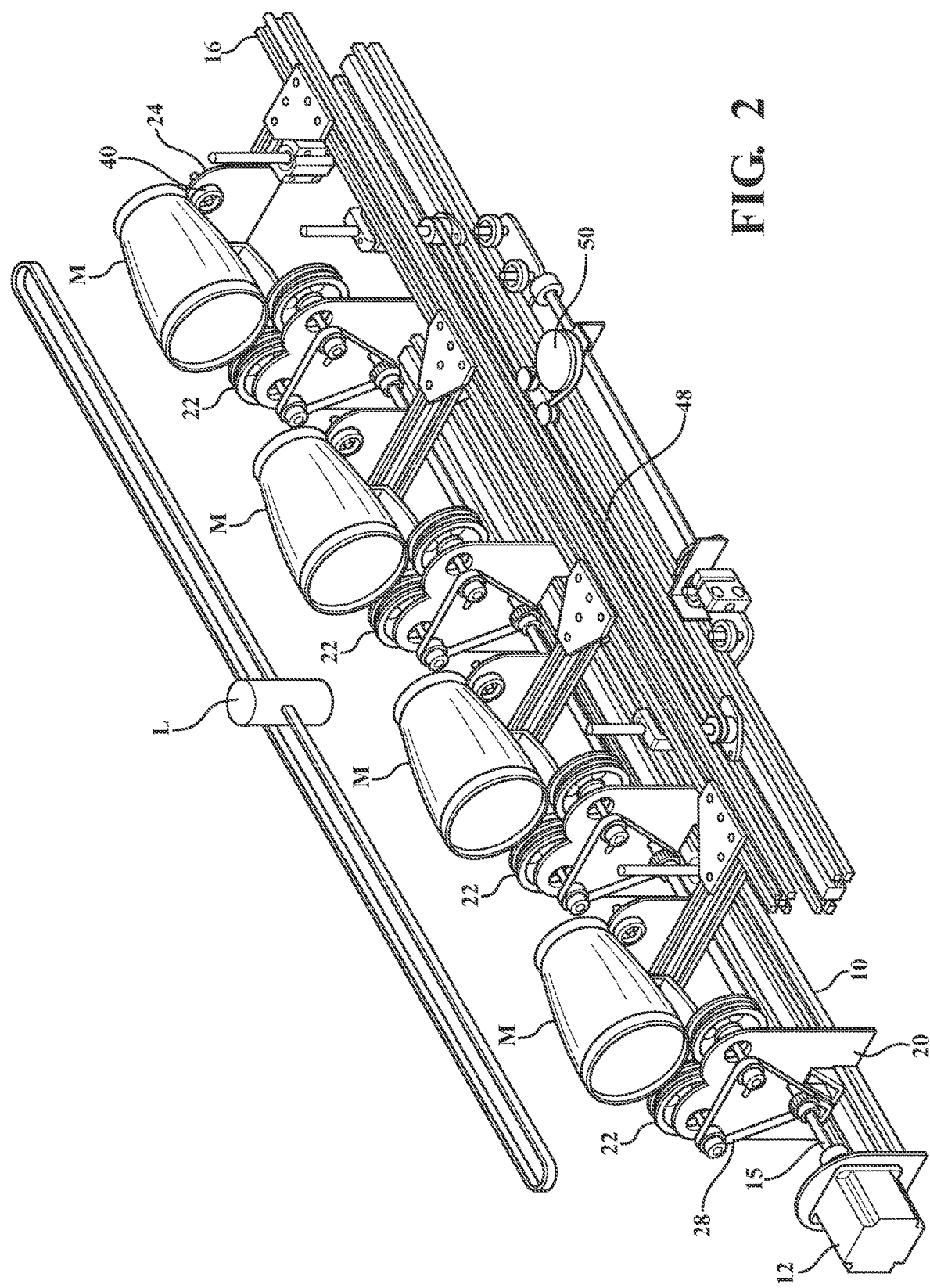
FIG. 2 is another perspective view of the fixture with tapered cylindrical mugs mounted serially on the fixture and a laser tool L mounted for movement along an axis parallel to the base beam.
Figure 3:
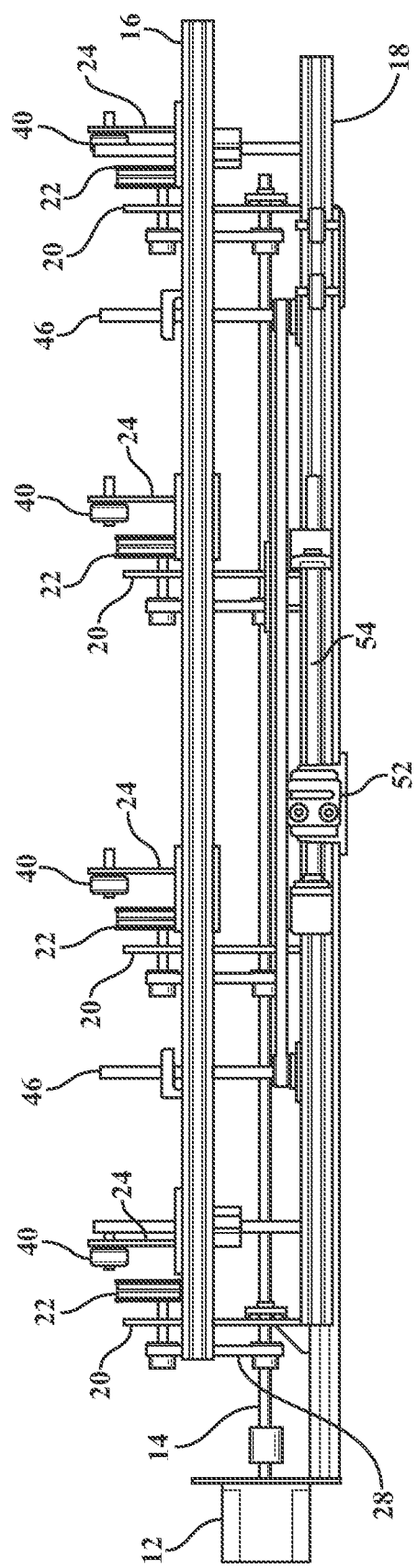
FIG. 3 is a side view of the fixture without objects mounted thereon.
Figure 4:
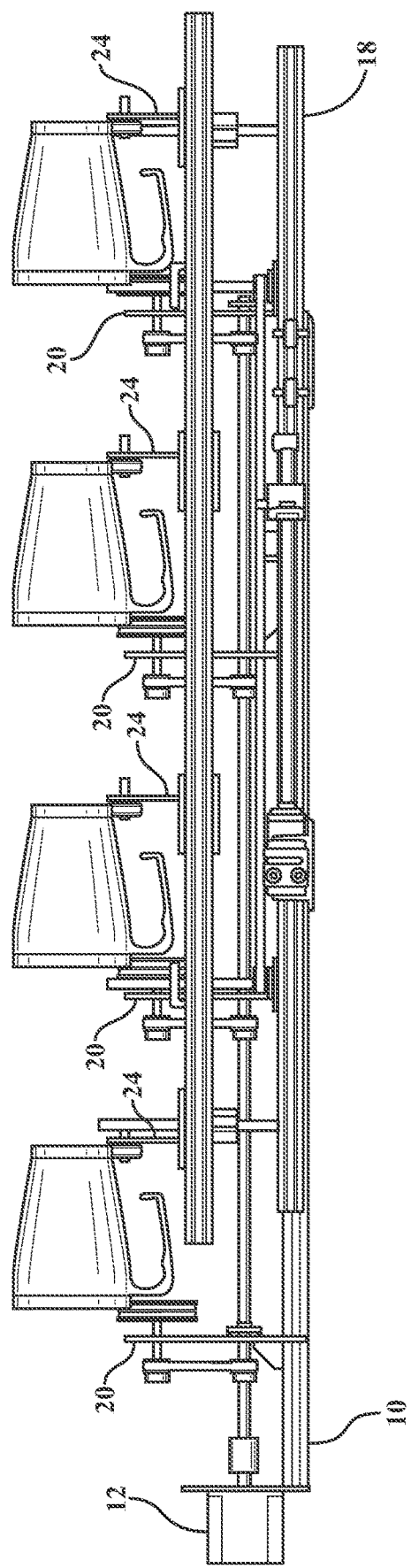
FIG. 4 is a side view of the fixture with the mugs mounted thereon.
Figure 5:
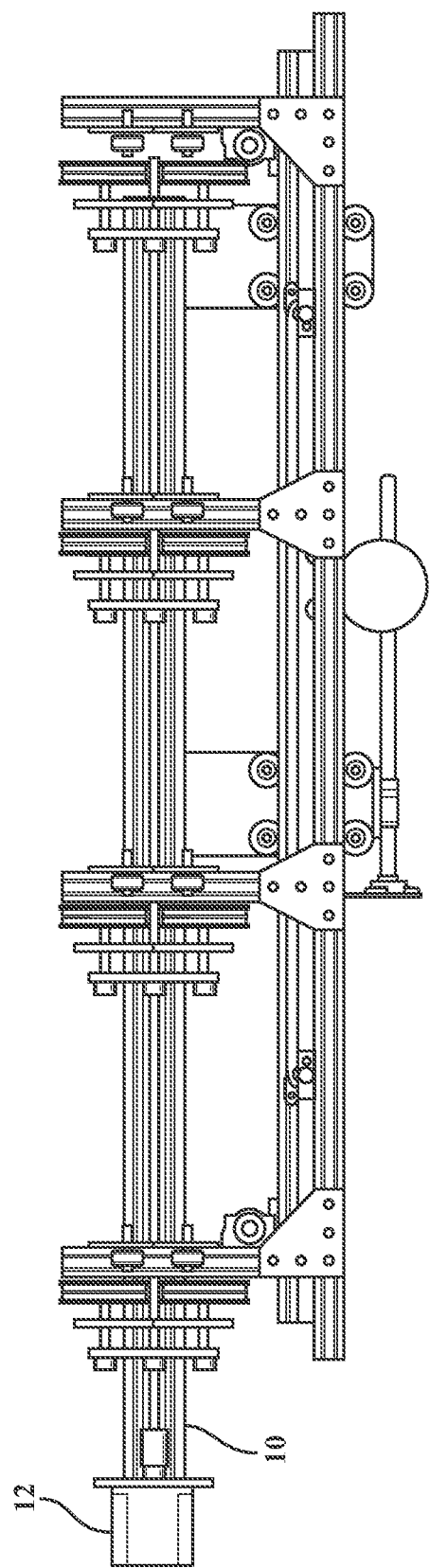
FIG. 5 is a top view of the fixture without mounted objects.
Figure 6:
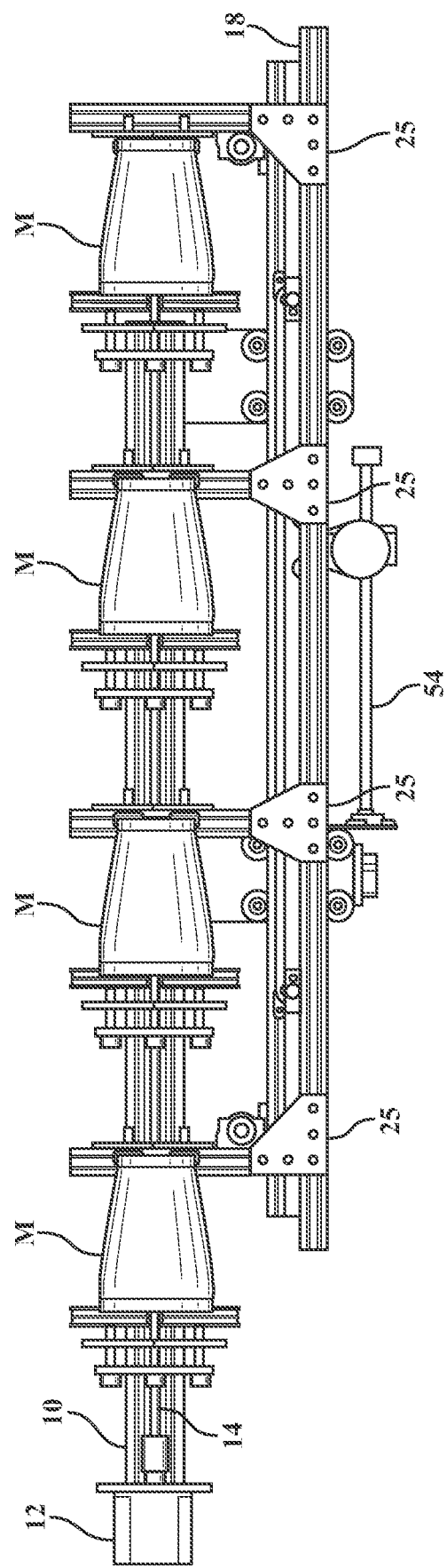
FIG. 6 is a top view of the fixture with mugs mounted in each station.

The master beam 10 carries thereon at the left end as shown in the figures a stepper motor 12 having an output shaft 14 which runs substantially along the length of the beam 10 between stations 14a, 14b, 14c and 14d, all of which are identical and all of which are intended to receive and hold during an engraving process an object such as a cylindrical glass or ceramic mug M or the like. It will be understood that the term "cylindrical", as used herein, refers to both straight-sided and tapered objects. The master beam has attached to it at regular intervals along the X-axis a series of plates 20 each of which carries a pair of rotatable driven wheels 22 on which the mugs M to be engraved are cradled as shown in FIGS. 2, 4 and 6. The plates 20 are vertical and parallel to one another.

The fixture further comprises a slave beam 18 also made of extruded aluminum and a lifting frame 16 in the form of a beam also made of extruded aluminum and arranged in parallel with and above the slave beam 18. All of the members 10, 16 and 18 are arranged parallel to the X-axis of laser tool displacement.

Slave plates 24 are attached to the lifting frame 16 by means of flat horizontal plates 28 which are arranged at regular intervals along the frame. The plates 24 carry sets of idler wheels 40 that, along with drive wheels 22, carry an object M in cradled fashion in each station. Means hereinafter described are provided to gang-adjust both the horizontal distance between plates 20 and 24 in each station and the height of the slave wheels 40 relative to the master beam 10.

Figure 8:
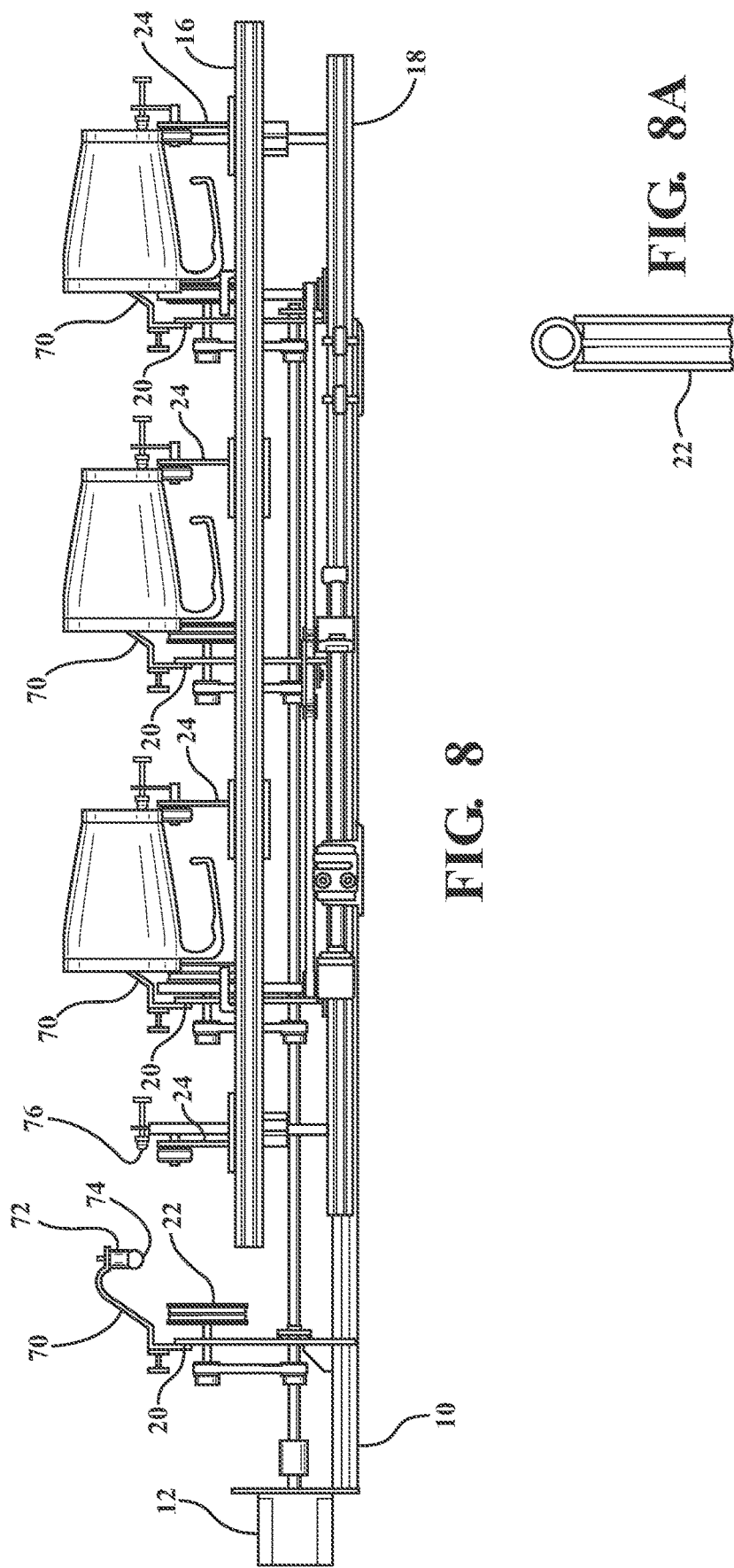
FIG. 8 is a side view of the fixture of FIG. 7.
Figure 9:
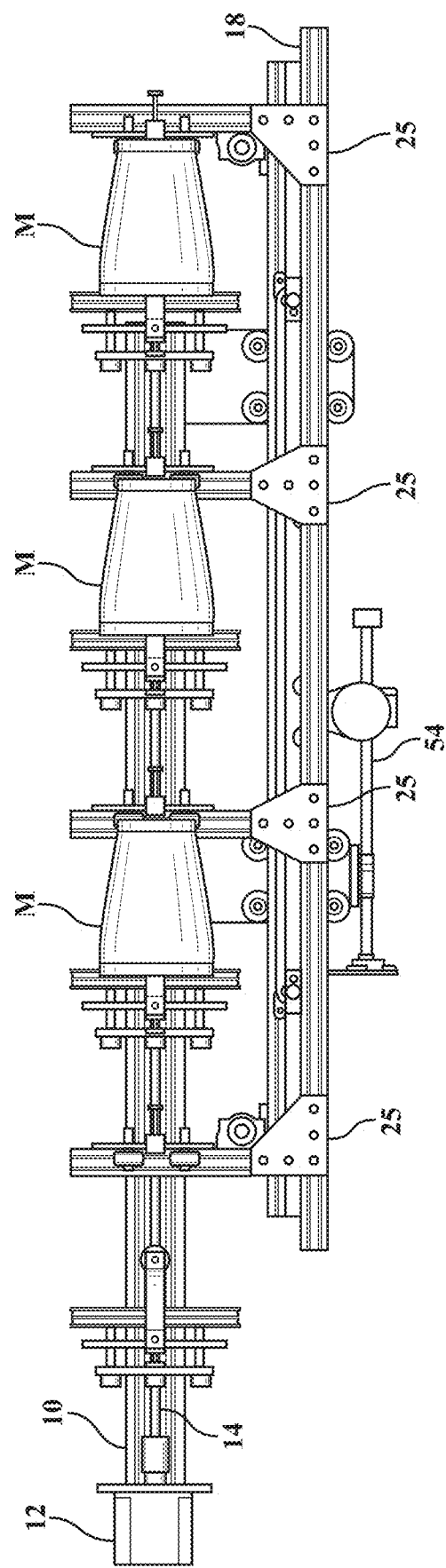
FIG. 9 is top view of the fixture of FIGS. 7 and 8.
Figure 10:
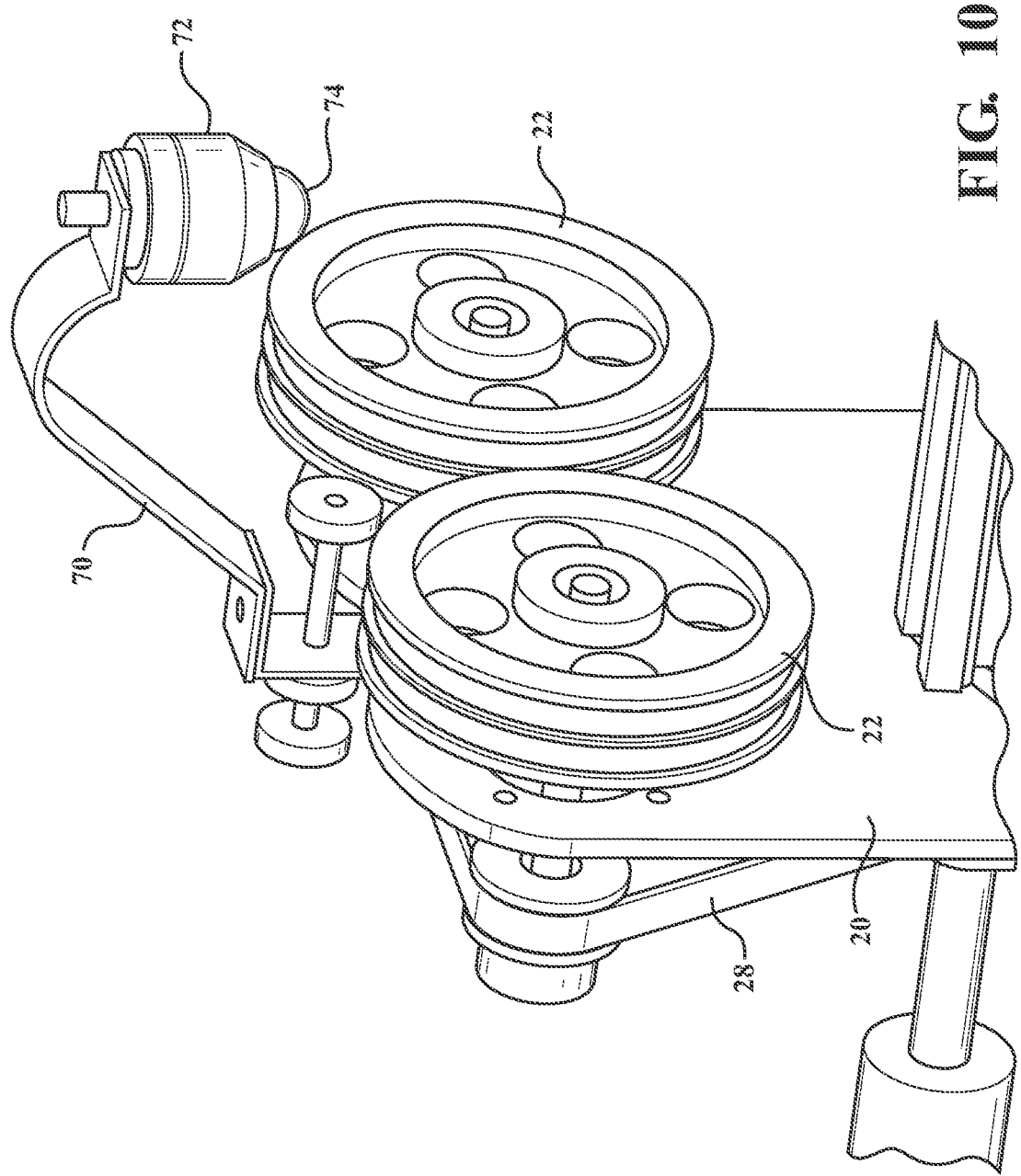
FIG. 10 is a perspective view of the hold down accessory for use with the apparatus while engraving glasses or mugs.

The drive wheels 22 in each station are arranged in side-by-side fashion with parallel axes of rotation and are connected to be incrementally rotated by the shaft 15 by way of a pulley system comprising a belt 28 wrapped around pulleys 30, 32 and 34 mounted for rotation. The inner surface of the belt 28 is grooved to match the grooved surface of at least the pulley 30 to prevent slippage between the incrementally rotating shaft 15 and the drive wheels 22 during the engraving operation. Each drive wheel 22 carries in a circumferential groove a silicon rubber ring to add friction that prevent slippage between the wheels 22 and the objects M when rotated as shown in FIG. 8A.

Each slave plate 24 carries a pair of side-by-side idler wheels 40 which are rotatably mounted on plate 24 and arranged to cradle a surface of the mugs M and allow rotation thereof during incremental laser engraving operation.

Gang-adjustment of the height of each of the slave plates 24 is provided by a lifting frame 16 carrying all of the plates 24 and their idler wheels 40. Linear guide rods 60 are controlled and driven by lead screws 46 synchronized by a drive belt 48 which, in turn, is rotated by hand knob 50 to raise and lower the lifting frame 16 relative to the base beam 10. The purpose of this adjustment structure is to level the surfaces of the mugs M before starting the programmed laser movement, thereby eliminating a loss of focus for the laser beam which would otherwise occur if the target surfaces were to change in distance from the laser tool as the laser moves along the X-axis.

The distance between the drive wheels 22 and the idler wheels 40 in each station is also gang-adjustable. This is accomplished by moving the slave beam 18 left or right along rollers 59 mounted on stationary plate 58. Beam 18 is driven by screw 62 in nut 52 on plate 58.

Figure 7:
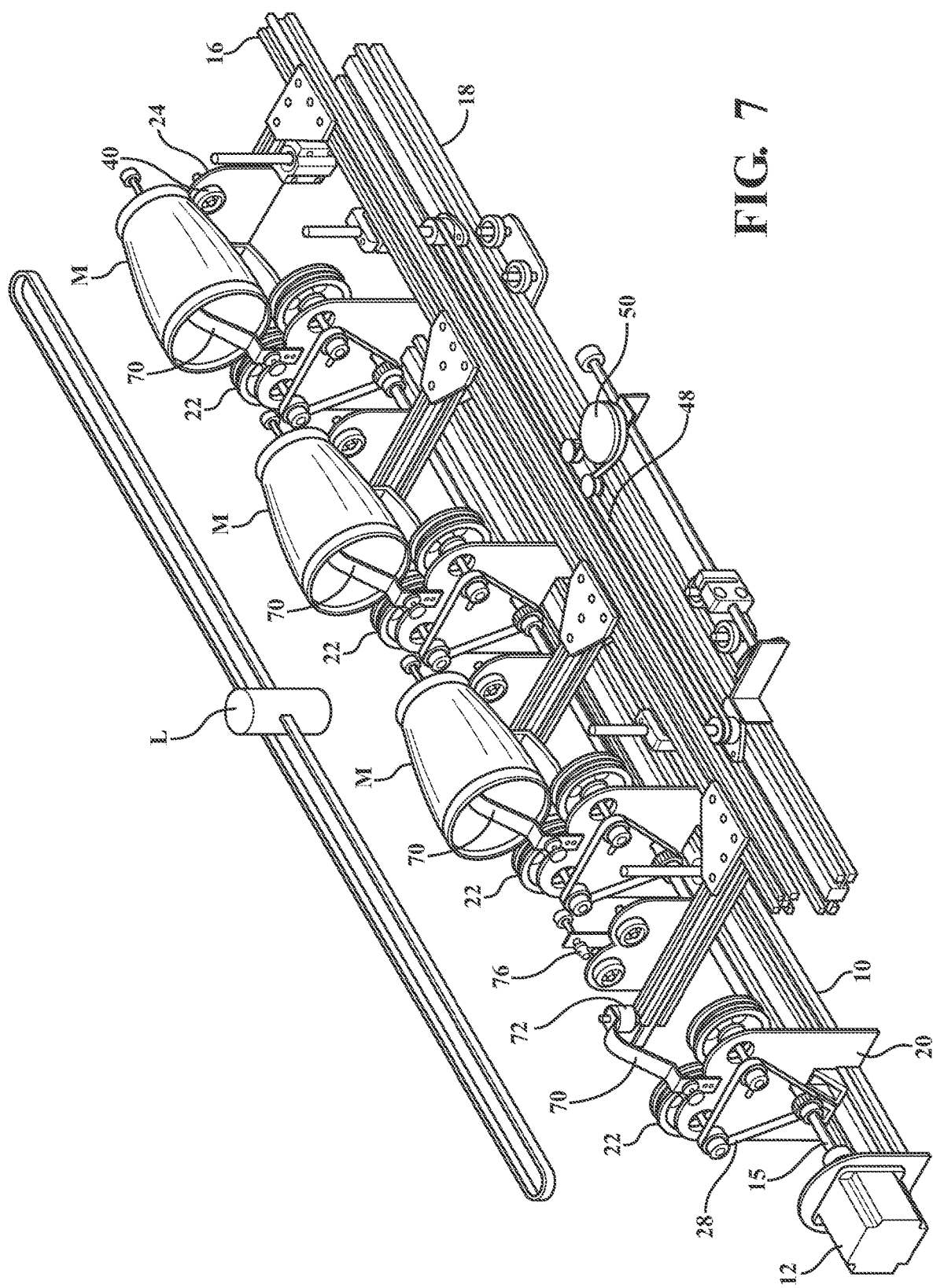
FIG. 7 is a perspective view of the fixture with added details of the devices used to maintain the mugs in position during an engraving process.

Looking now to FIGS. 7-10, the preferred mechanisms for maintaining mugs M in location within their respective stations during an engraving process requiring incremental rotation will be described. In FIG. 7, the left-most station is shown empty so that the location holding structures can be more easily seen.

A spring arm 70 made of stainless steel is shaped and adjustably mounted on each plate 20 by a set of fastener holes. At the distal end of the arm 70 there is a downwardly oriented holder 72 for a plastic or nylon roller ball 74 which is held by spring pressure against an inside surface of a mug M in such a way as to avoid marring or scratching that inside surface but to hold the mug down on the drive wheels 22 for traction. The arm 70 may also be shaped to prevent axial movement of a mug toward the drive wheels. Limiter structure 76 adjacent the idler wheels 40 prevent movement of the articles away from the drive wheels 22. In total, the holders are shaped and structured to prevent axial movement of the mugs in both directions during the engraving operation and to hold the mugs down on the traction rings of the drive wheels 22.

Operation

Briefly describing the overall operation, the engraving process starts with the digitization of the message or image or both which is to be transferred to the engraved objects so as to control the scanning movement of the laser L along the X axis as well as the incremental rotation of the mugs or other objects to complete the two-dimensional engraving process. This is known in the digitized engraving field.

The objects to be engraved are then placed on the drive wheels 22 and idler wheels 40 in a cradled fashion in each of the stations 14 and the height adjustment is made as necessary to level the surfaces to be engraved.

At this point, the laser beam is energized and the scan is started back and forth while incrementally rotating the objects by means of the drive wheels 22 and the stepper motor 24 between left and right laser scans until the message and/or image to be engraved in two-dimensional fashion is finished.

At this point, the mugs M are removed and replaced with the next batch to be engraved.

It will be understood that various modification and changes to the apparatus disclosed herein and described above can be made while achieving the same or equivalent functions. The adjustments described above, while done manually here, can also be done electronically or in powered fashion under manual and/or machine control. The master slave beams and lifting beams can all take different forms and multiple fixtures can be arranged in parallel fashion within a given laser engraving housing to perform multiple parallel laser engraving operations at the same time. Similarly, the presentation based on four stations is illustrative only and it will be understood by those skilled in the art that the number of objects receiving stations can be anywhere from two to an indefinite number depending on the size of the laser housing.

What is claimed:

1. A fixture for use with an engraver of the type including a tool moveable along a horizontal axis for serially engraving a plurality of serially arranged cylindrical objects wherein said fixture comprises:
 a base alignable with said horizontal axis;
 a plurality of object receiving stations arranged in series along said axis, each said station including a drive structure and a slave structure, the drive and slave structures being spaced from one another along said horizontal axis; each drive structure comprising drive wheels for rotating an object thereon;
 said slave structure having slave wheels adapted to support an object in concert with said drive wheels;

a drive system including a motor with a output shaft gang-connected to said drive wheels for synchronously incrementally rotating all of said drive wheels between linear passes of said engraving tool during an engraving process; and means for gang-adjusting the height of said slave wheels relative to said base for all said stations.

2. A fixture as defined in claim 1 further including means for gang-adjusting the horizontal distance along said axis between said drive and slave structures each of said stations to accommodate objects of various lengths.

3. The fixture as defined in claim 1 wherein said drive system includes a stepper motor and drive belt connecting said output shaft by way of said pulleys between the drive motor shaft and at least one of said drive wheels in each station.

4. The drive system defined in claim 3 further including friction rings preferably mounted on an outer object engaging surface of each of said drive wheels.

5. The fixture defined in claim 1 further including a lifting frame and manual control element for gang-raising and lower the slave structure relative to said base.

6. The fixture as defined in claim 1 further including means for maintaining the position of said objects along the X-axis during an engraving operation.

7. A fixture for holding a series of identical cylindrical objects during an engraving process using a tool movable along an axis wherein the fixture comprises:

a base beam arranged parallel to the tool axis and supporting thereon a series of equally spaced plates holding driven wheels for holding and rotating objects resting thereon;

a drive motor for driving a shaft connected commonly to all of the driven wheels so that all objects arranged in series are rotated simultaneously;

a slave beam mounted parallel with the base beam and supporting passive holders for said objects equal in number to the plates holding the driven wheels;

a first adjustment device for simultaneously adjusting the distance between the plates and the passive holders according to the lengths of the objects to be engraved; and a second adjustment device for simultaneously adjusting the height of the passive holders relative to the drive wheels.

8. The fixture defined in claim 7 wherein the drive motor is a stepper motor.

9. The fixture defined in claim 7 further including friction rings on the driven wheels for preventing slippage between the wheels and objects rotated thereon during an engraving process.

* * * * *